United States Patent
Rodriguez et al.

(10) Patent No.: US 10,944,535 B2
(45) Date of Patent: Mar. 9, 2021

(54) OFDMA BASEBAND CLOCK SYNCHRONIZATION

(71) Applicant: Shure Acquisition Holdings, Inc., Niles, IL (US)

(72) Inventors: Michael Rodriguez, Arlington Heights, IL (US); Honghui Xu, Buffalo Grove, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 16/425,694

(22) Filed: May 29, 2019

(65) Prior Publication Data
US 2020/0382268 A1 Dec. 3, 2020

(51) Int. Cl.
*H04L 7/00* (2006.01)
*H04L 5/00* (2006.01)
(Continued)

(52) U.S. Cl.
CPC ............ *H04L 7/0012* (2013.01); *H04J 11/00* (2013.01); *H04L 5/0007* (2013.01); *H04L 7/0033* (2013.01); *H04L 27/2666* (2013.01); *H04L 27/2675* (2013.01); *H04J 2011/002* (2013.01); *H04J 2011/0096* (2013.01)

(58) Field of Classification Search
CPC ... H04L 7/0012; H04L 5/0007; H04L 7/0033; H04L 27/2666; H04L 27/2675; H04J 11/00
See application file for complete search history.

(56) References Cited

U.S. PATENT DOCUMENTS

| 5,889,759 A | 3/1999 | McGibney |
| 6,021,110 A | 2/2000 | McGibney |

(Continued)

FOREIGN PATENT DOCUMENTS

| CN | 1787507 | 6/2006 |
| EP | 740868 | 11/1996 |

(Continued)

OTHER PUBLICATIONS

Briggs, et al., "Sample Clock Offset Detection and Correction in the LTE Downlink Receiver," Texas Tech University, Innovative Integration, 2011, 26 pp.

(Continued)

*Primary Examiner* — Jaison Joseph
(74) *Attorney, Agent, or Firm* — Neal, Gerber & Eisenberg LLP (57) ABSTRACT

A method for synchronizing baseband clocks in an OFDMA wireless microphone system is disclosed. An example method includes receiving a plurality of pilot subcarriers from an audio transmitter. The method also includes determining a timing offset estimate based on the pilot subcarriers. The method further includes determining a tuning value by passing the timing offset estimate through a proportional-integral controller. The method still further includes determining a modified reference signal by modifying a reference oscillator based on the tuning value. And the method yet further includes controlling (i) an audio sample clock and (ii) an antenna data clock based on the modified reference signal.

16 Claims, 4 Drawing Sheets

(51) Int. Cl.
*H04L 27/26* (2006.01)
*H04J 11/00* (2006.01)

(56) References Cited

U.S. PATENT DOCUMENTS

| | | | |
|---|---|---|---|
| 6,363,128 B1* | 3/2002 | Isaksson | H04L 27/2656 375/355 |
| 6,487,252 B1 | 11/2002 | Kleider | |
| 6,618,452 B1 | 9/2003 | Huber | |
| 7,012,881 B2 | 3/2006 | Kim | |
| 7,110,387 B1 | 9/2006 | Kim | |
| 7,206,367 B1* | 4/2007 | Moore | H04L 12/66 348/515 |
| 7,558,245 B2 | 7/2009 | Laroia | |
| 8,050,366 B2 | 11/2011 | Lin | |
| 8,165,249 B2 | 4/2012 | Li | |
| 8,374,075 B2 | 2/2013 | Bogdan | |
| 8,379,752 B2* | 2/2013 | Kleider | H04L 25/0232 375/260 |
| 8,542,616 B2 | 9/2013 | Staszewski | |
| 9,780,988 B2 | 10/2017 | Alexander | |
| 2004/0156309 A1* | 8/2004 | Chadha | H04L 27/2675 370/208 |
| 2005/0084046 A1* | 4/2005 | Seo | H04L 7/0058 375/350 |
| 2005/0100106 A1* | 5/2005 | Chen | H04L 27/2657 375/260 |
| 2005/0163262 A1 | 7/2005 | Gupta | |
| 2006/0209979 A1* | 9/2006 | Sandell | H04L 27/2657 375/267 |
| 2007/0098091 A1* | 5/2007 | Hou | H04L 27/2657 375/260 |
| 2008/0069252 A1* | 3/2008 | Wenzhen | H04L 27/2657 375/260 |
| 2008/0090610 A1* | 4/2008 | Wang | H04M 1/72522 455/556.2 |
| 2010/0056069 A1 | 3/2010 | Toshimitsu | |
| 2010/0166042 A1* | 7/2010 | Iannuzzelli | H04H 20/67 375/145 |
| 2010/0172427 A1* | 7/2010 | Kleider | H04L 25/0232 375/260 |
| 2014/0169280 A1* | 6/2014 | Yu | H04W 72/082 370/329 |
| 2018/0262277 A1* | 9/2018 | Koksal | H04B 11/00 |
| 2019/0215206 A1* | 7/2019 | Zhu | H04L 27/0014 |

FOREIGN PATENT DOCUMENTS

| | | |
|---|---|---|
| EP | 1221234 | 7/2002 |
| EP | 1224735 | 7/2002 |
| EP | 1739910 | 1/2007 |
| EP | 2050271 | 4/2009 |
| EP | 3211847 | 8/2017 |
| JP | 4153347 | 11/2004 |
| JP | 3943228 | 7/2007 |
| JP | 4459749 | 4/2010 |
| WO | 2003090400 | 10/2003 |
| WO | 2005026766 | 3/2005 |
| WO | 2008069555 | 6/2008 |
| WO | 2008082242 | 7/2008 |
| WO | 2011003495 | 1/2011 |
| WO | 2012027880 | 3/2012 |

OTHER PUBLICATIONS

Ohukainen, "Residual carrier frequency offset and symbol timing offset in narrow-band OFDM modulation," Master's Thesis, University of Oulu, Spring 2017, 58 pp.

International Search Report and Written Opinion for PCT/US2020/034706 dated Aug. 20, 2020.

* cited by examiner

OFDMA BASEBAND CLOCK SYNCHRONIZATION

TECHNICAL FIELD

This application generally relates to timing and frequency synchronization for wireless audio systems and devices using orthogonal frequency division multiple access (OFDMA) for communication, particularly audio devices having an audio sample clock and an antenna data clock.

BACKGROUND

Orthogonal frequency division multiplexing (OFDM) is a method of encoding digital data on multiple carrier frequencies. Subcarriers are sent together to form a wideband high speed communication link. This communication link can be used for many purposes, including digital television and audio broadcasting, DSL internet access, wireless networks, power line networks, and mobile communications.

In an OFDMA audio system, there may be an access point and one or more subscribers. The subscriber devices must compensate for any frequency offset in their respective antenna data clocks relative to the access point, so that frame timing and symbol timing are maintained. This allows the subscriber devices to properly receive and transmit data with the access point.

Existing subscriber devices may include a sample rate conversion block that prevents audio distortion introduced by inserting or dropping samples. The sample rate conversion block, however, requires additional resources and introduces latency into the audio path.

Accordingly, there is an opportunity for a method and system for OFDMA baseband clock synchronization that does not require an additional sample rate conversion block, particularly in the context of high quality audio applications, and thus reduces the resources required and removes a source of latency in the audio path.

SUMMARY

Embodiments of the present disclosure are intended to alleviate some of the above-noted problems by providing methods and systems for locking the baseband clocks of the subscribers in a wireless microphone system to the access point, by generating the respective baseband clocks from a common reference. The access point (also referred to as an "audio transmitter") and each subscriber device (also referred to as "audio receivers") all include one or more baseband clocks (i.e., controlling an audio sample clock and/or data sample clock) that are set based on reference oscillators. Embodiments of the present disclosure may include tuning the reference oscillators of each subscriber device based on measured phase differences, such that the baseband clocks of all the subscribers and the access point are in sync.

An example method includes receiving a plurality of pilot subcarriers from an audio transmitter. The method also includes determining a timing offset estimate based on the pilot subcarriers. The method further includes determining a tuning value by passing the timing offset estimate through a proportional-integral controller. The method still further includes determining a modified reference signal by modifying a reference oscillator based on the tuning value. And the method yet further includes controlling (i) an audio sample clock and (ii) an antenna data clock based on the modified reference signal.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

As noted above, embodiments of the present disclosure relate to wireless audio system and device communication using OFDMA, and methods and systems for baseband synchronization between devices of the wireless audio system. In order for a subscriber device to properly communicate with an access point, the subscriber device must be able to compensate for any frequency offset relative to the access point, so that frame and symbol timing is maintained. In some examples, this may be done by frequency and phase locking between the access point and subscriber baseband clocks. The baseband clocks may be used by the access point and the subscriber to transmit and receive data (i.e., audio data, control signals, pilot signals, etc.) via their respective antennas, sample input audio, and for various other purposes.

Frequency and phase locking between the baseband clocks of the wireless audio devices may be facilitated by having the access point and the one or more subscribers generate all their respective baseband clocks from a common reference oscillator. Each subscriber can tune its own reference oscillator based on a phase offset measurement from any one of the baseband clocks (even from other subscribers) in order to maintain a frequency and phase lock with the access point reference. This results in all of a given subscriber's baseband clocks being locked to the respective access point references, because all the baseband clocks are generated from the common reference.

In embodiments of the present disclosure, a subscriber may tune its reference frequency (i.e., reference oscillator) based on sample clock timing (i.e. phase) offset measurements between the subscriber and an access point, that are taken for each frame during communication between the access point and the subscriber. Timing offsets between the transmission sample clock and the reception sample clock in an OFDMA system result in a channel phase slope when plotted in the frequency domain. This slope is proportional to the sample clock timing offset. As such, by determining the slope of the channel phase offset between a transmitted signal (from the access point) and a received signal (at the subscriber), the delay, and thus a timing offset measurement, can be determined. This timing offset measurement can then be used to tune the subscriber reference oscillator. The tuned reference oscillator can then be used to control the antenna data clock and the audio sample clock of the subscriber, thereby enabling the subscriber and access point baseband clocks to be in sync. And by making a determination of the timing offset measurement for every frame, the reference oscillator of the subscriber audio device can be continuously tuned to maintain a "steady state" synchronization. Further, by controlling both the antenna data clock and the audio sample clock of the subscriber audio device based on the reference oscillator, both clocks will be in sync with each other and with the corresponding clocks of the access point.

Figure 1:
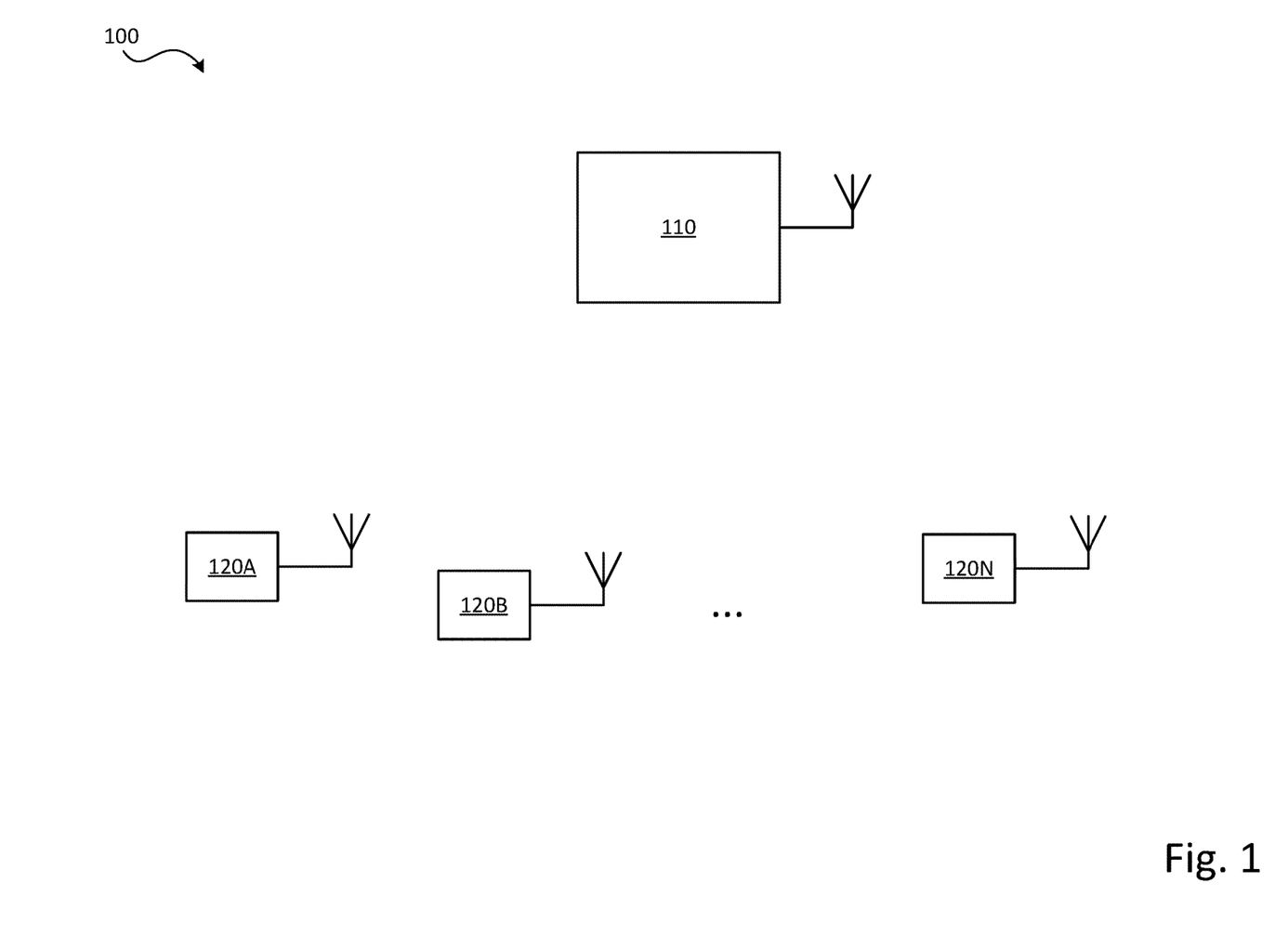
FIG. 1 is a simplified block diagram of a wireless communication system, in accordance with some embodiments of the present disclosure.

FIG. 1 illustrates an example simplified block diagram of a wireless audio communication system or environment 100 in which the methods and apparatuses of the present disclosure may be used. The wireless audio communication system may include an access point 110 and a plurality of subscriber devices 120A-N.

The access point 110 may be any suitable computing device, and may include a processor, memory, antenna, and/or one or more other signal processing or computing components. In some examples, access point 110 may be an auto mixer, laptop or desktop computer, or any other device that is configured to communicate with various other devices (e.g., a plurality of wireless audio devices), including subscriber devices 120A-N.

The access point 110 may be configured for performing a variety of functions or acts, such as those described in this disclosure (and accompanying drawings). The access point 110 may include various components, including for example, a processor and memory. The access point 110 may also include a display, user interface, and/or one or more other electronic components. The processor may include a general purpose processor (e.g., a microprocessor) and/or a special purpose processor (e.g., a digital signal processor (DSP)). The processor may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory includes multiple kinds of memory, particularly volatile memory and non-volatile memory. The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In some examples, access point 110 may be a base station, centralized controller, or other computing device configured to communicate with multiple wireless audio subscriber devices at the same time. For example, the access point may operate in a conference room, and the subscriber devices maybe a plurality of microphones that communicate with the access point, to provide a conferencing environment. Other examples are possible as well.

The access point 110 may include one or more antennas that enable wireless audio communication with the one or more subscriber devices 120A-N, as well as a reference oscillator. The reference oscillator may be used to control one or more baseband clocks of the access point. For example, an antenna sample clock may be controlled based on the reference oscillator, so as to control the timing of transmission and reception of various data.

The access point 110 may be configured to transmit data to one or more wireless audio subscriber devices 120A-N in a variety of formats and using a variety of communication protocols. For instance, the access point 110 may transmit data using an OFDMA scheme, wherein data is transmitted in frames. Each frame may include a plurality of subcarriers, some of which are used to transmit data, some of which are pilot subcarriers used to synchronize the access point with the subscriber, and some of which are "guard" subcarriers to protect against interferences from adjacent channels or subchannels in the frequency spectrum. In one example, a given channel may be broken into 64 different subcarriers. The channel may include 52 data subcarriers, 4 pilot subcarriers, and 8 guard subcarriers. These numbers are used for example only, and it should be appreciated that other numbers may be used as well.

Each pilot subcarrier may be transmitted at a specific and known frequency, and may be configured to not carry any audio or control information. The known frequency location of each pilot subcarrier may enable the subscriber that receives the frame to determine a phase shift, and thus a timing offset between the access point 110 and the subscriber. This is discussed in further detail below.

The wireless audio subscriber devices 120A-N may be portable wireless audio receivers, microphones, conference systems, speakers, and/or any other devices that can be communicatively coupled to the access point 110. The embodiments disclosed herein are described with reference to the subscriber devices each being a microphone, however, it should be appreciated that the concepts and features disclosed herein may be applied to other types of subscriber devices as well.

Figure 2:
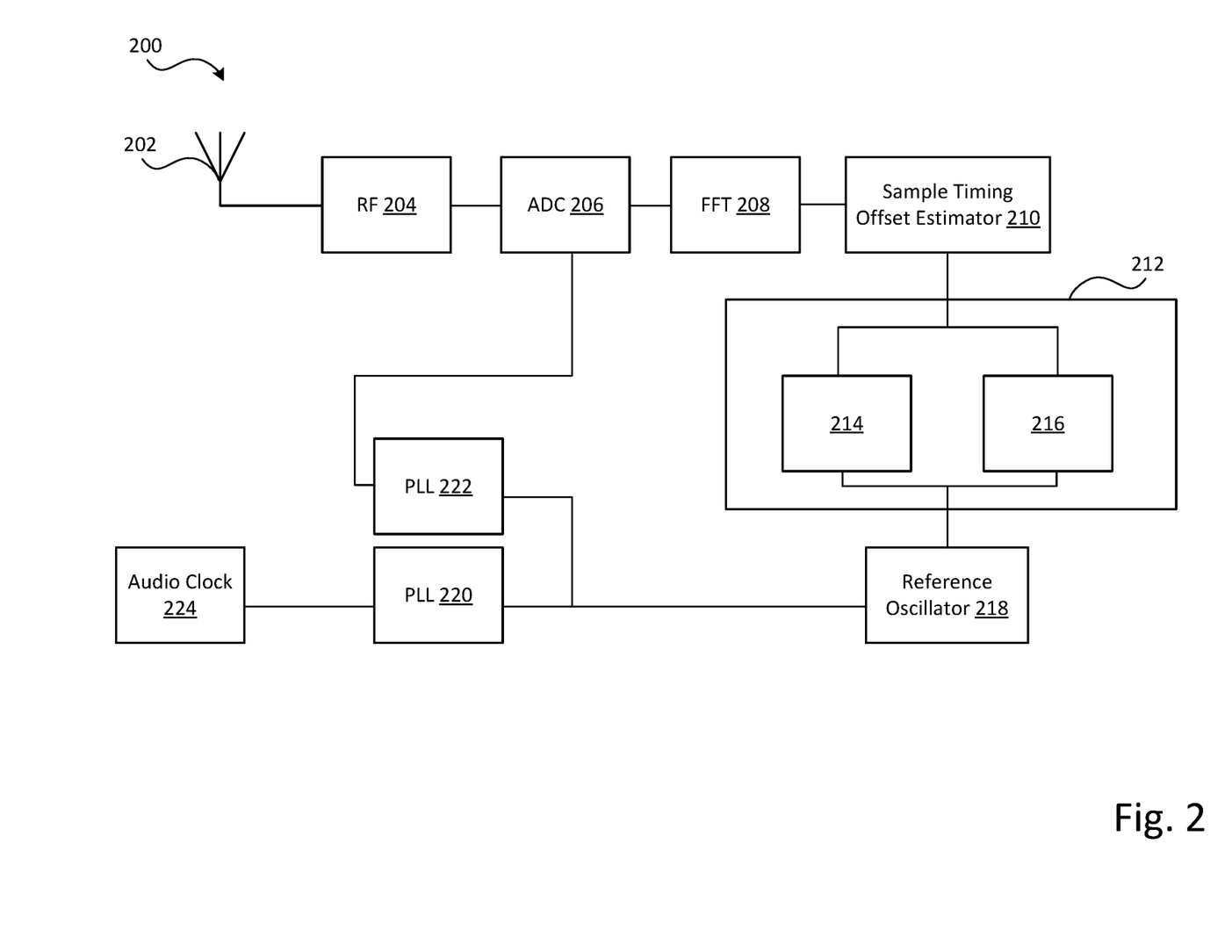
FIG. 2 is a simplified signal process flow diagram of an example subscriber device of the system of FIG. 1, in accordance with some embodiments of the present disclosure.
Figure 3:
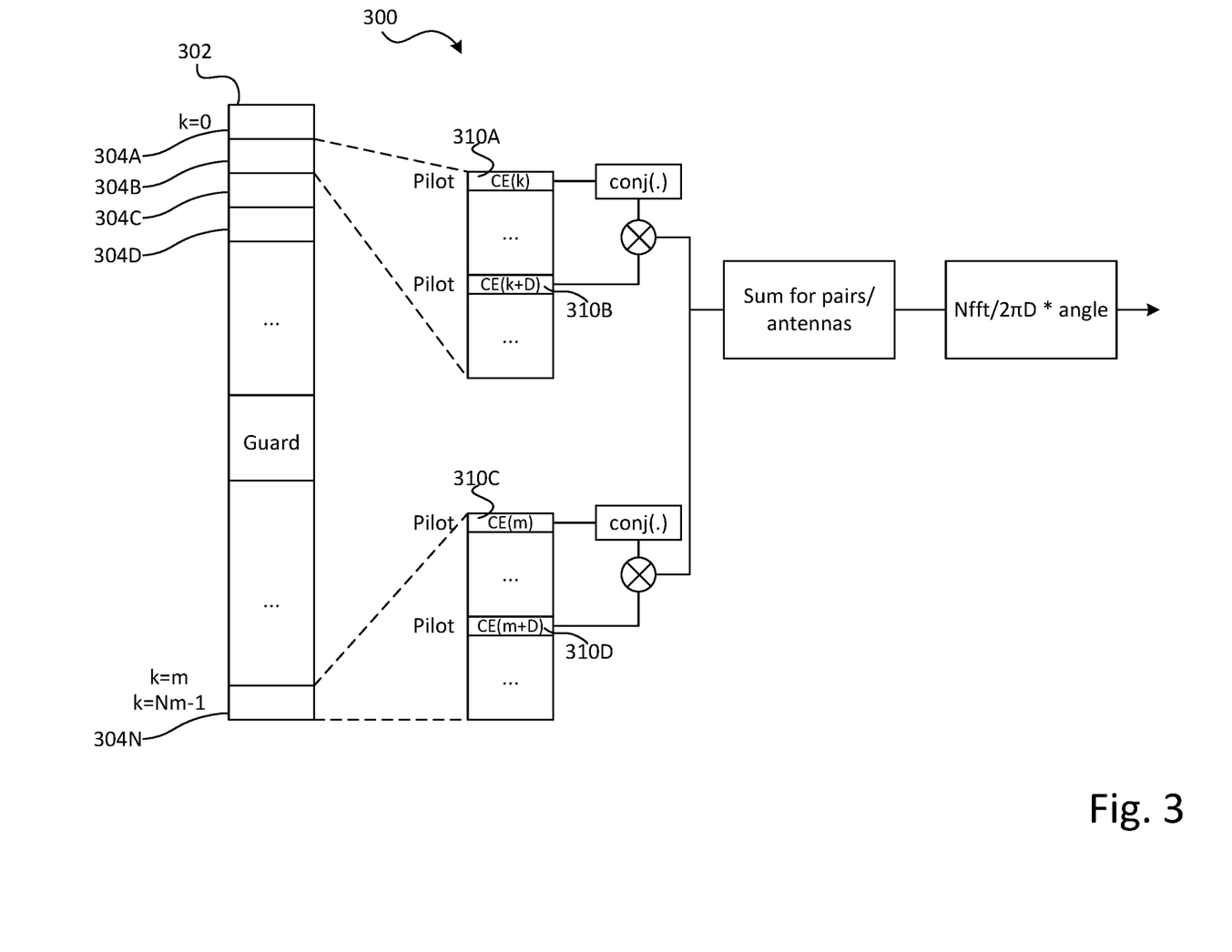
FIG. 3 is a simplified signal process flow diagram of the sample timing offset estimator of FIG. 2, in accordance with some embodiments of the present disclosure.

Each wireless audio subscriber device 120A-N may include one or more antennas, a reference oscillator, a baseband clock for antenna/symbol transmission and reception via the antenna, a baseband clock for audio sampling, and appropriate processing and memory components to carry out the functions described herein, particularly the signal processing functions described with respect to FIGS. 2 and 3. Specifically regarding the processor and/or memory of the subscriber devices 120A-N, the disclosure herein with respect to the processor and/or memory of the access point 110 also applies to each subscriber device 120A-N.

The antenna(s) of each wireless audio subscriber device may operate based on an antenna data clock, which determines the rate at which data is sampled from the antenna. The reference oscillator is used by the subscriber device to control the various baseband clocks, which can include the antenna data clock. The wireless audio subscriber device also includes a baseband clock for audio sampling, which determines the rate at which an incoming audio signal into the microphone is sampled.

FIG. 2 is a simplified signal process flow diagram 200 of an example wireless audio subscriber device of the system of FIG. 1, in accordance with some embodiments of the present disclosure. Any one or more of the subscriber devices 120A-N may include the components and functionality described with respect to FIG. 2.

Diagram 200 illustrates an antenna 202, a radio frequency (RF) receiver 204, an analog to digital converter (ADC) 206, a Fourier transform block (FFT block) 208, a sample timing offset estimator 210, a proportional-integral controller 212, a reference oscillator 218, first and second phase locked loops 220 and 222, and an audio sample clock 224.

The antenna 202 may be a single antenna, or may include a plurality of antennas. The plurality of antennas may be arranged in an array. The RF receiver 204 may be configured to detect OFDMA signals.

The ADC 206 may be configured to receive signals from the RF receiver. The ADC 206 may also be called a sampler, because the ADC is configured to sample the input signal at a particular rate. The sampling rate is determined based on the antenna data clock, which is determined based on the reference oscillator 218 as described below. The FFT block 208 is configured to convert the sampled input signal from the ADC 206 into the frequency domain.

Where a wireless audio subscriber includes two or more antennas, each antenna may have a corresponding RF receiver (204), ADC (206), and FFT block (208). The output of the FFT block for each antenna may feed into the sample timing offset estimator 210.

The sample timing offset estimator 210 is configured to receive the output of the FFT block 208 (i.e., a frame) and determine a time offset estimate between the access point 110 and the subscriber. This is described in more detail with respect to FIG. 3.

FIG. 3 illustrates a simplified process flow diagram 300 of the sample timing offset estimator 210. The sample timing offset estimator 210 takes in the frame 302 as input from the FFT block 208. It should be understood that the sample timing offset estimator 210 is configured to receive as input multiple frames corresponding to multiple antennas, and process each frame as disclosed herein. The frame 302 includes a plurality of resource blocks 304A-N, distributed across the bandwidth of the frame 302. Each resource block has two pilot subcarriers (e.g., pilot subcarriers 310a and 310b), each having an expected frequency. The sample timing offset estimator 210 first determines a channel estimate for both pilot subcarriers in the resource block, and then computes the channel phase slope by multiplying the channel estimate at subcarrier k+D 310B by the complex conjugate of the channel estimate at subcarrier k 310A. The sample timing offset estimator 210 repeats this computation over all resource blocks 304A-N (and their corresponding pairs of pilot subcarriers) and accumulates the resulting channel phase slope values, in order to filter out noise and the impact of frequency-selective fading.

The sample timing offset estimator 210 is also configured to estimate the sample timing offset over a plurality of antennas, where the subscriber includes two or more antennas. The same process of computing channel estimates for the pilot subcarriers and multiplying the channel estimates within each resource block is repeated using the FFT output for the additional antenna(s), and the resulting channel phase slope values are accumulated with the sum from the first antenna.

The slope of the channel phase (in the frequency spectrum) is proportional to the timing offset between the access point and the subscriber. By scaling the accumulated channel phase slope, the timing offset in samples can be estimated for the frame 302. The timing offset estimate is then output by the sample timing offset estimator 210.

The PI controller 212 receives the timing offset estimate. The PI controller includes a weighted integration of previously determined timing offset estimates 214, and a weighted current timing offset estimate 216. The PI controller can adjust the weights based on a trade-off between fast initial convergence on an offset between the access point 110 and the subscriber, and a smooth steady state operation. Heavily weighting the most recent timing offset provides faster convergence, but makes the system susceptible to transient noise and disruptions. Using a lesser weight for the most recent timing offset provides slower convergence, but a more smooth change during steady state operation of the PI controller, thus making the system less susceptible to rapid changes and noise. The PI controller 212 outputs a tuning value to be used by the reference oscillator 218.

The reference oscillator 218 takes in the tuning signal output by the PI controller. The tuning signal is used to modify the reference oscillator, so as to reduce the timing offset between the access point 110 and the subscriber.

The output of the reference oscillator 218 is passed to two phase locked loops (PLLs) 220 and 222. The first PLL 220 generates a baseband clock frequency signal for the audio sample clock 224. The second PLL 222 generates a baseband clock frequency signal for the ADC 206, so as to control the sampling of the antenna.

The audio sample clock 224 gathers audio data where the subscriber device includes a microphone. Using the same reference oscillator to provide baseband clock signals for the audio sample clock and the transmission/reception of data via the ADC 206 enables the system to reduce issues of latency and eliminate the need for dropping or adding samples, as well as providing other operational benefits.

Figure 4:
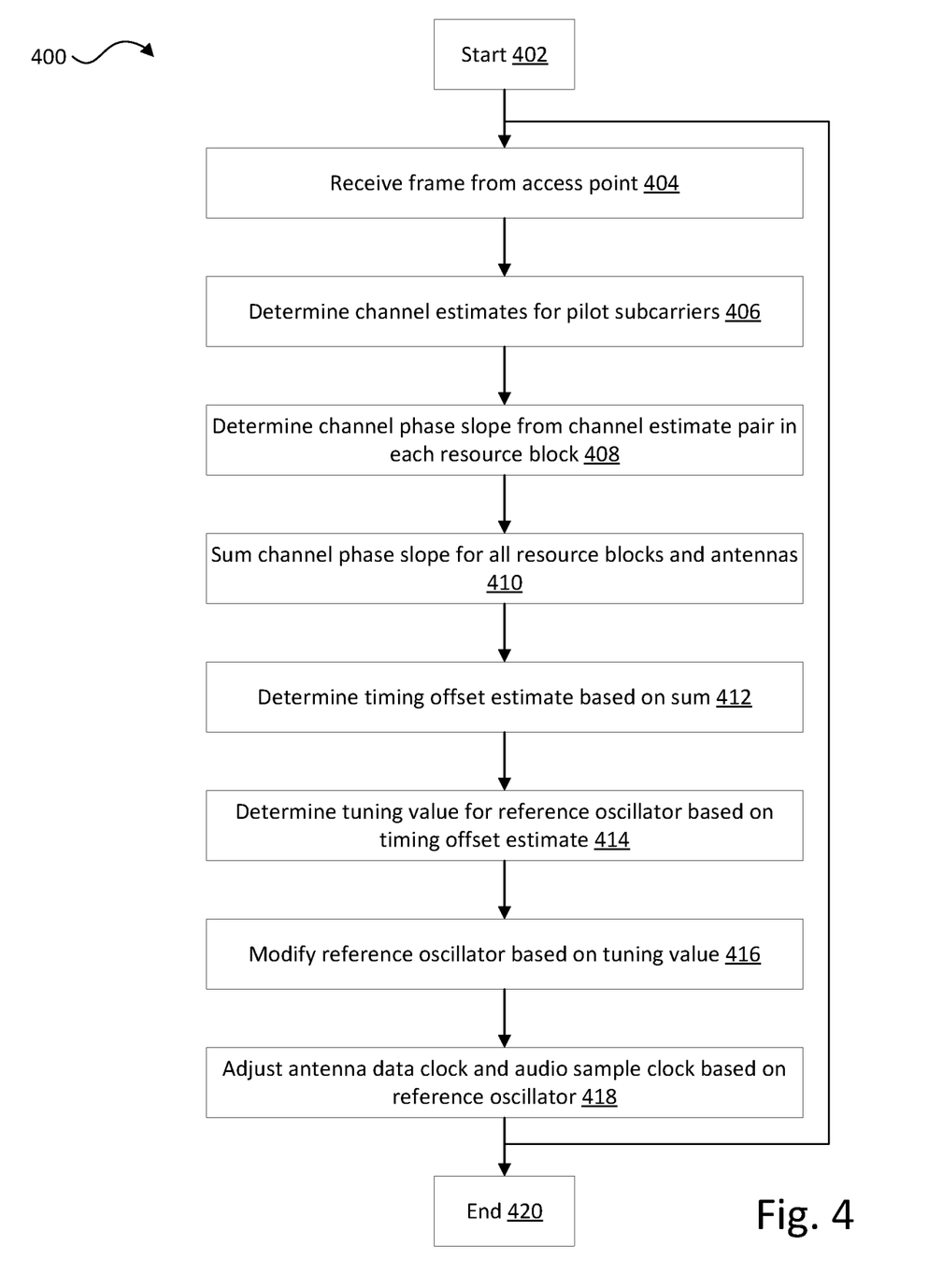
FIG. 4 is a flowchart illustrating an example method, in accordance with some embodiments of the present disclosure.

FIG. 4 illustrates a flowchart of an example method 400 according to embodiments of the present disclosure. Method 400 may enable a wireless audio subscriber device to adjust its reference oscillator, so as to synchronize its baseband clocks with an access point. The flowchart of FIG. 4 is representative of machine readable instructions that are stored in memory and may include one or more programs which, when executed by a processor may cause one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 starts at block 402. At block 404, method 400 includes receiving a frame from an access point. As noted above with respect to FIG. 3, the frame may include a plurality of subcarriers, such as data subcarriers, pilot subcarriers, and more.

At block 406, method 400 may include determining channel estimates for the pilot subcarriers of the frame. The channel estimates are then used at block 408 to determine the channel phase slope for the pair of pilot subcarriers in each resource block. At block 410, method 400 includes summing the phase shifts for all pairs of pilot subcarriers, and across all the antennas used by the subscriber.

At block 412, method 400 may include determining a timing offset estimate based on the sum of the channel phase slope values for each resource block and each antenna. This timing offset estimate is measured in samples.

At block 414, method 400 may include determining a tuning value for the subscriber reference oscillator based on the timing offset estimate. This can include passing the timing offset estimate through a proportional-integral controller, which adds weights to the current timing offset, and an integration of past timing offsets. This enables the subscriber to reach a fast convergence in some scenarios, while enabling smooth steady-state operation as well.

At block 416, method 400 may include modifying the reference oscillator based on the tuning value. The reference oscillator may provide a reference frequency that is used to control one or more baseband clocks of the subscriber.

At block 418, method 400 may include controlling an antenna data clock and an audio sample clock based on the reference oscillator, which was modified by the tuning value. Controlling both the audio sample clock and the antenna data clock based on the same reference oscillator frequency enables the subscriber to reduce latency and avoid issued from having to insert or drop audio samples. Method 400 may then revert back to block 404, and receive a next frame from the access point. The method may be repeated to form a steady-state feedback loop, ensuring that the audio sample clock and antenna data clock remain in sync with the baseband clocks of the access point. Method 400 may then end at block 420.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method for baseband clock synchronization in a wireless microphone system comprising:
   receiving a plurality of pilot subcarriers from an audio transmitter;
   determining a timing offset estimate based on the pilot subcarriers, wherein determining the timing offset estimate comprises:
      determining a channel phase slope based on the plurality of pilot subcarriers, wherein determining the channel phase slope comprises:
         determining the channel estimate for each of the plurality of pilot subcarriers,
         determining one or more channel phase slope values corresponding to one or more pairs of the plurality of pilot subcarriers; and
         summing the one or more channel phase slope values; and
      determining the timing offset estimate based on the channel phase slope;
   determining a tuning value by passing the timing offset estimate through a proportional-integral controller;
   determining a modified reference signal by modifying a reference oscillator based on the tuning value; and
   controlling (i) an audio sample clock and (ii) an antenna data clock based on the modified reference signal.

2. The method of claim 1, further comprising:
   receiving a plurality of frames, each frame including the plurality of pilot subcarriers.

3. The method of claim 2, further comprising determining the tuning value for each frame.

4. The method of claim 3, further comprising;
   determining the modified reference signal for each frame; and
   updating the audio sample clock and the antenna data clock each frame.

5. The method of claim 1, wherein determining the tuning value comprises applying weighted coefficients to (i) the timing offset estimate and (ii) an integration of previously determined timing offset estimates.

6. A wireless audio microphone system comprising:
an audio transmitter configured to:
  transmit a plurality of pilot subcarriers; and
one or more audio receivers, each configured to:
  receive the plurality of pilot subcarriers;
  determine a timing offset estimate based on the plurality of pilot subcarriers;
  determine a tuning value by passing the timing offset estimate through a proportional-integral controller, wherein determining the tuning value comprises applying weighted coefficients to (i) the timing offset estimate and (ii) an integration of previously determined timing offset estimates;
  determine a modified reference signal by modifying a reference oscillator based on the tuning value; and
  control (i) an audio sample clock and (ii) an antenna data clock based on the modified reference signal.

7. The wireless audio system of claim 6, wherein the audio transmitter is further configured to transmit a plurality of frames, each frame including the a respective plurality of pilot subscribers, and wherein the one or more audio receivers are each further configured to receive the plurality of frames.

8. The wireless audio system of claim 7, wherein the one or more audio receivers are each further configured to determine the tuning value for each frame.

9. The wireless audio system of claim 8, wherein the one or more audio receivers are each further configured to;
  determine the modified reference signal for each frame; and
  update the audio sample clock and the antenna data clock each frame.

10. The wireless audio system of claim 6, wherein the one or more audio receivers are each further configured to determine the timing offset estimate by:
  determining a channel phase slope based on the plurality of pilot subcarriers; and
  determining the timing offset estimate based on the channel phase slope.

11. The wireless audio system of claim 10, wherein the one or more audio receivers are each further configured to determine the channel phase slope by:
  determining a channel estimate for each of the plurality of pilot subcarriers;
  determining one or more channel phase slope values corresponding to one or more pairs of the plurality of pilot subcarriers; and
  summing the one or more channel phase slope values.

12. An audio receiver of a wireless audio system, the audio receiver comprising:
an antenna configured to receive a plurality of pilot subcarriers from an audio transmitter; and
circuitry configured to:
  determine a timing offset estimate based on the plurality of pilot subcarriers;
  determine a tuning value based on the timing offset estimate by applying weighted coefficients to (i) the timing offset estimate and (ii) an integration of previously determined timing offset estimates;
  determine a modified reference signal based on the tuning value; and
  control (i) an audio sample clock and (ii) an antenna data clock based on the modified reference signal.

13. The audio receiver of claim 12, wherein the antenna is further configured to receive a plurality of frames, each frame including the plurality of pilot subcarriers, and wherein the circuitry is further configured to determine the tuning value for each frame.

14. The audio receiver of claim 13, wherein the circuitry is further configured to:
  determine the modified reference signal for each frame; and
  update the audio sample clock and the antenna data clock each frame.

15. The audio receiver of claim 12, wherein the circuitry is further configured to determine the timing offset estimate by:
  determining a channel phase slope based on the plurality of pilot subcarriers; and
  determining the timing offset estimate based on the channel phase slope.

16. The audio receiver of claim 15, wherein the circuitry is further configured to determine the channel phase slope by:
  determining a channel estimate for each of the plurality of pilot subcarriers;
  determining one or more channel phase slope values corresponding to one or more pairs of the plurality of pilot subcarriers; and
  summing the one or more channel phase slope values.

* * * * *